(12) United States Patent
Assar et al.

(10) Patent No.: US 9,766,689 B2
(45) Date of Patent: Sep. 19, 2017

(54) EFFECTIVE POWER MANAGEMENT FOR PLUGGABLE TRANSCEIVER RECEIVING HARDWARE IN NETWORK SWITCHING SYSTEMS

(71) Applicant: Lenovo Enterprise Solutions (Singapore) Pte. Ltd., Singapore (SG)

(72) Inventors: Behzad Assar, Ottawa (CA); Stephen J. Flint, Ottawa (CA); Michael W. J. Hogan, Kanata (CA); Mark Pearson, Cambridge (CA)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 349 days.

(21) Appl. No.: 14/139,987

(22) Filed: Dec. 24, 2013

(65) Prior Publication Data

US 2015/0177818 A1 Jun. 25, 2015

(51) Int. Cl.
*G06F 1/32* (2006.01)

(52) U.S. Cl.
CPC .......... *G06F 1/3287* (2013.01); *G06F 1/3278* (2013.01); *Y02B 60/126* (2013.01); *Y02B 60/1282* (2013.01)

(58) Field of Classification Search
CPC ............................ G06F 1/3278; G06F 1/3287
See application file for complete search history.

(56) References Cited

U.S. PATENT DOCUMENTS

| | | | |
|---|---|---|---|
| 6,701,442 B1 | 3/2004 | Kunz et al. | |
| 7,073,077 B1 | 7/2006 | Gavlik | |
| 7,707,435 B2 | 4/2010 | Lee | |
| 7,865,748 B2 | 1/2011 | Lee et al. | |
| 7,890,784 B2 | 2/2011 | Katoh | |
| 7,962,680 B2 | 6/2011 | Fukunaga | |
| 8,185,757 B2 | 5/2012 | Lee | |
| 8,195,247 B2 | 6/2012 | Lee et al. | |
| 8,214,665 B2 | 7/2012 | Diab | |
| 2008/0148080 A1 | 6/2008 | Ma | |
| 2008/0155157 A1* | 6/2008 | Lee | H04L 49/30 710/301 |
| 2010/0115316 A1 | 5/2010 | Diab | |
| 2012/0087652 A1* | 4/2012 | Horishita | H04L 12/2861 398/25 |
| 2012/0246458 A1* | 9/2012 | Jain | G06F 1/3253 713/100 |

(Continued)

FOREIGN PATENT DOCUMENTS

FR 2964282 A1 3/2012

*Primary Examiner* — Zahid Choudhury
*Assistant Examiner* — Joshua Neveln
(74) *Attorney, Agent, or Firm* — Zilka-Kotab, P.C.

(57) ABSTRACT

A transceiver-receiving system, such as a network switch with pluggable transceivers, is built with hardware and machine logic so that power to certain components is turned off when the pluggable transceiver is not present in its plug in slot. The machine logic for handling the turning off an on of power is present on a processor on the board to which the plug-in slot is attached. The other hardware for handling the turning on and off of the power includes a communication line from the plug-in slot to the processor, and a set of switch(es) located on the power path for the component(s) to be turned on and off according to the presence of absence of the transceiver.

16 Claims, 3 Drawing Sheets

(56) References Cited

U.S. PATENT DOCUMENTS

2012/0301138 A1* 11/2012 Tolliver ................ H04B 10/40
    398/25
2013/0007489 A1 1/2013 Unnikrishnan et al.

* cited by examiner

FIG. 1

SFP + PIN OUT     200

| P11 | 11 | 10 | P10 |
| P12 | 12 | 9 | P9 |
| P13 | 13 | 8 | P8 |
| P14 | 14 | 7 | P7 |
| P15 | 15 | 6 | P6 |
| P16 | 16 | 5 | P5 |
| P17 | 17 | 4 | P4 |
| P18 | 18 | 3 | P3 |
| P19 | 19 | 2 | P2 |
| P20 | 20 | 1 | P1 |

FIG. 2

QSFP + PIN OUT     300

| P20 | 20 | 19 | P19 |
| P21 | 21 | 18 | P18 |
| P22 | 22 | 17 | P17 |
| P23 | 23 | 16 | P16 |
| P24 | 24 | 15 | P15 |
| P25 | 25 | 14 | P14 |
| P26 | 26 | 13 | P13 |
| P27 | 27 | 12 | P12 |
| P28 | 28 | 11 | P11 |
| P29 | 29 | 10 | P10 |
| P30 | 30 | 9 | P9 |
| P31 | 31 | 8 | P8 |
| P32 | 32 | 7 | P7 |
| P33 | 33 | 6 | P6 |
| P34 | 34 | 5 | P5 |
| P35 | 35 | 4 | P4 |
| P36 | 36 | 3 | P3 |
| P37 | 37 | 2 | P2 |
| P38 | 38 | 1 | P1 |

EFFECTIVE POWER MANAGEMENT FOR PLUGGABLE TRANSCEIVER RECEIVING HARDWARE IN NETWORK SWITCHING SYSTEMS

BACKGROUND OF THE INVENTION

The present invention relates generally to the field of network switching and more particularly to network switching systems that include pluggable transceiver modules (for example, SFP+ (small form-factor pluggable plus) transceivers).

A network switch or switching hub is a computer networking device that links network segments or network devices. A switch is a telecommunication device that receives a message from any device connected to it, and then transmits the message only to the device for which the message was meant. This makes the switch a more intelligent device than a hub, which receives a message and then transmits it to all the other devices on its network. The network switch plays an integral part in most modern ethernet local area networks (LANs). Switches exist for various types of networks including fiber channel, ethernet and others.

Some network switch systems use "pluggable transceivers" to receive and transmit communications as part of the system's functioning as a network switch. Some known types of pluggable transceivers include SFP, SFP+ and QSFP+ (quad small form-factor pluggable plus). Some network switch systems include multiple plug-in module connectors (for example, slot or socket connectors) with each connector being capable of removably receiving a pluggable transceiver. Herein, any computer that accepts one or more removable transceiver modules is referred to as a "transceiver-receiving computer." Transceiver-receiving computers include, but are not limited to network switch type transceiver-receiving computers and switching hub type transceiver-receiving computers.

Some transceiver-receiving computer systems include one or more dedicated printed circuit board (PCB) assembly(ies), each of which includes one or more plug-in module connector(s). In this kind of transceiver-receiving system, the PCB assembly: (i) mechanically removably supports and removably secures the plug-in module connector(s); (ii) provides certain types of processing on signals sent to and/or received from the pluggable transceiver(s); and (iii) provides electrical power to the pluggable transceiver(s) and the processing components included in the PCB assembly.

An ASIC (application-specific integrated circuit) is an (IC) integrated circuit customized for a particular use, rather than intended for general purpose use. As feature sizes have shrunk and design tools improved, the maximum complexity and functionality possible in an ASIC has grown. Modern ASICs often include entire microprocessors, memory blocks including ROM (read only memory), RAM (random access memory), EEPROM (electrically erasable programmable read only memory), flash memory and other large building blocks. Some ASICs require multiple voltages. Some ASICs further require voltage sequencing, where one voltage is applied to a chip prior to another voltage, to properly initialize the device and/or avoid hardware damage. Some PCB assemblies of network switches, as discussed above, use one or more ASICs to help process signals sent to and/or received from their pluggable transceiver(s).

More specifically, some known types of ASICs for use in transceiver-receiving computers include: (i) switch ASICs that perform the network switching functionality for signals sent to and/or received from the pluggable transceiver(s); (ii) physical layer (PHY) ASICs for connecting to physical media; (iii) SerDes (serializer/deserializer) ASICs for providing a high speed signaling interface (SerDes machine logic may be built and/or programmed into the switch ASIC mentioned above); (iv) re-timer ASICs for re-clocking the data; (v) buffer ASIC(s) that serve as a buffer memory for incoming and/or outgoing transceiver signals; and/or (vi) XPS (cross point switch) ASICs for handling multiple inputs to be routed to different outputs (for example, a 2×2 cross point switch lets port A at input go to port A output or port B output). It is known that these various types of ASIC functions can be combined on a single chip and/or distributed over multiple chips. It is also known that at least some of these kinds of transceiver signal processing components can be implemented in forms other than an ASIC, such as being implemented by a general purpose IC or other programmable logic device. For example, the buffer memory may be implemented as a standard random access memory (RAM). Regardless of their specific form of implementation, these transceiver signal processing components: (i) generally require a supply of power when operational; (ii) will herein collectively be referred to as powered transceiver signal processing components (or PTSP components); (iii) for PTSPC involved in switching, these will herein sometimes be referred to as switching-related powered transceiver signal processing components (SPTSP components); and (iv) for PTSP components that are interposed between the plug-in module connector and the SPTSP components, these will herein sometimes be referred to as intermediate powered transceiver signal processing components (IPTSP components).

SUMMARY

According to one aspect of the present invention, there is a method including the following steps (not necessarily in the following order): (i) providing a transceiver-receiving system including a first machine logic module, a first receiving connector, a first communication line, a first power supply, a first powered component, and a first switch; (ii) receiving, from the first receiving connector through the first communication line and by the first machine logic module, a first signal indicating that a removable transceiver module has been removed from the first receiving connector; and (iii) controlling, by the first machine logic module in response to receipt of the first signal, the first switch to turn off so that a flow of power from the first power supply to the first powered component is stopped.

According to a further aspect of the present invention, a transceiver-receiving system includes: a first machine logic module; a first receiving connector; a first communication line; a first power supply; a first powered component; and a first switch. The first receiving connector, the first communication line and the first machine logic module are structured, connected and/or programmed to send from the first receiving connector through the first communication line to the first machine logic module, a first signal indicating that a removable transceiver module has been removed from the first receiving connector. The first logic module is structured, connected and/or programmed to, in response to receipt of the first signal, control the first switch to turn off so that a flow of power from the first power supply to the first powered component is stopped.

DETAILED DESCRIPTION

Some embodiments of the present invention recognize the following with respect to the conventional state of the art of power management of networking switching devices: (i) it is getting difficult to manage in high speed ports; (ii) there is an issue that when high speed transceiver ports are not populated, there is wasted power being consumed by the entire switch; and (iii) wasted power increases electrical costs for the customer and also adds extra heat (thermals) to the product. Some embodiments of the present invention include machine logic that responds to removal of pluggable transceiver module from a network switching system by turning off power to powered component(s). In various embodiments, these powered components may include one, or more, of the following: (i) the plug-in module connector; (ii) switching-related powered transceiver signal processing components (SPTSP components); and/or (iii) intermediate powered transceiver signal processing components (IPTSP components). The turning off of powered component(s) may be implemented through one, or more, solid state switches. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
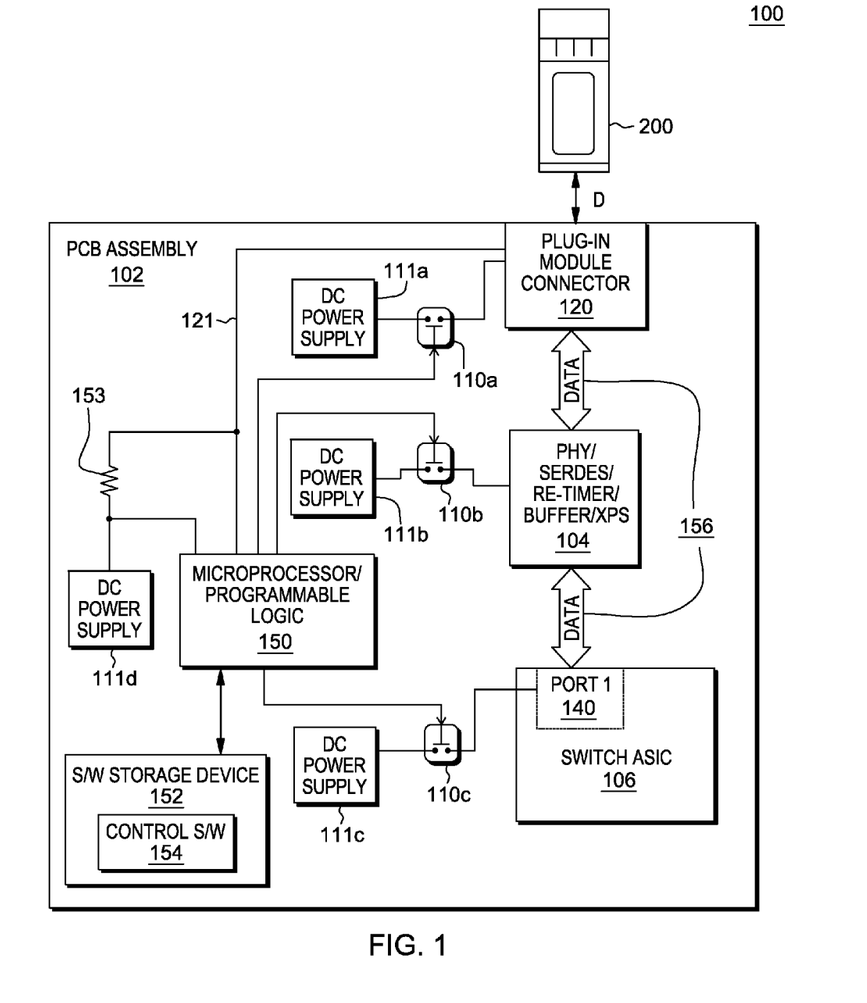
FIG. 1 is a schematic view of a first embodiment of a network switching system according to the present invention.
Figure 2:
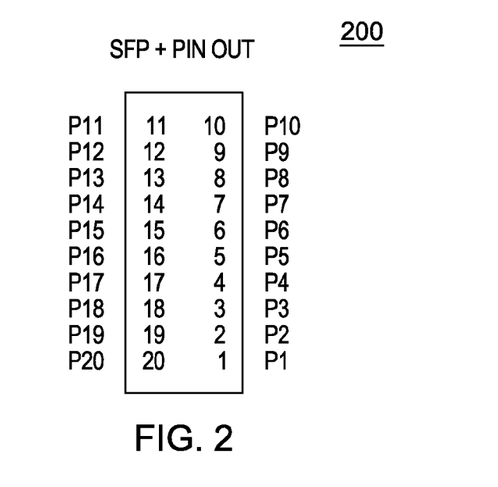
FIG. 2 is a first pin out diagram of a transceiver module suitable for use in some embodiments of the present invention.

FIGS. 1 and 2 show network switching (or transceiver-receiving) system 100, including: printed circuit board (PCB) assembly 102; and SFP+ pluggable transceiver module 200. PCB assembly 102 includes: ITPSP component set (including PHY ASIC, SerDes ASIC, re-timer ASIC, buffer ASIC and XPS ASIC) 104; switch ASIC 106 (including port sub-component 140); power switches 110a, b, c; direct current (DC) power supplies 111a, b, c, d; plug-in module connector (also called socket or slot) 120; communication line 121; microprocessor/programmable logic module 150; software storage device (see definition, below) 152; resistor 153; control software 154; and data bus 156.

As those of skill in the art will appreciate, system 100 is similar to conventional switching systems, except for power switches 110a, b, c and control software 154. While many variations on this hardware scheme are within the scope of the present invention, two possible variations that will be mentioned are: (i) software storage device 152 and control software 154 could be made as an integral part of module 150 of PCB assembly 102; or (ii) software storage device 152 and control software 154 could be external to PCB assembly 102.

Figure 3:
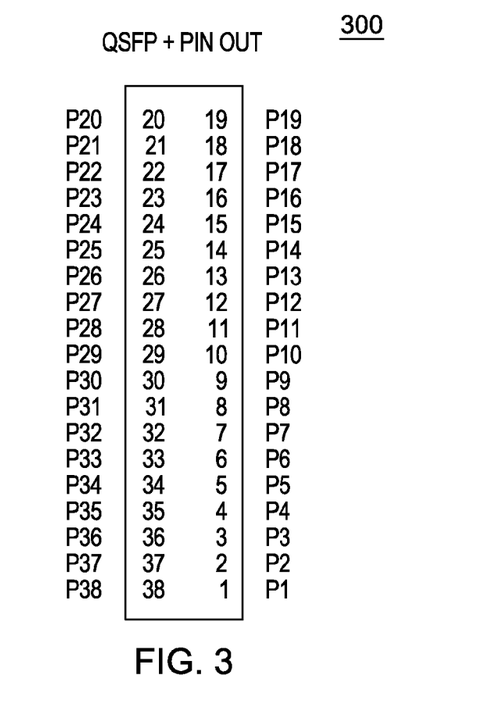
FIG. 3 is a second pin out diagram of a transceiver module suitable for use in some embodiments of the present invention.

As shown in FIG. 2, the 20-pin pin out configuration for SFP+ transceiver module 200 is as follows: (i) P1=GND; (ii) P2=TX_FAULT; (iii) P3=TX_DISABLE; (iv) P4=SDA; (v) P5=SCL; (vi) P6=MOD_ABS (note: this is the pin that sends out the signal indicating presence of the transceiver module); (vii) P7=RS0; (viii) P8=RX_LOS; (ix) P9=RS1; (x) P10=GND; (xi) P11=GND; (xii) P12=RXn; (xiii) P13=RXp; (xiv) P14=GND; (xv) P15=+3.3V; (xvi) P16=+3.3V; (xvii) P17=GND; (xviii) P18=TXp; (xix) P19=TXn; and (xx) P20=GND. Alternatively, other kinds of pluggable transceiver modules could be used, such as QSFP+ transceiver module 300, shown in FIG. 3, which has the following 38-pin pin out configuration: (i) P1=GND; (ii) P2=TX2n; (iii) P3=TX2p; (iv) P4=GND; (v) P5=TX4n; (vi) P6=TX4p; (vii) P7=GND; (viii) P8=MODSELn; (ix) P9=RESETn; (x) P10=3.3V; (xi) P11=SCL; (xii) P12=SDA; (xiii) P13=GND; (xiv) P14=RX3p; (xv) P15=RX3n; (xvi) P16=GND; (xvii) P17=RX1p; (xviii) P18=RX1n; (xix) P19=GND; (xx) P20=GND; (xxi) P21=RX2n; (xxii) P22=RX2p; (xxiii) P23=GND; (xxiv) P24=RX4n; (xxv) P25=RX4p; (xxvi) P26=GND; (xxvii) P27=MODPRSn (note: this is the pin that sends out the signal indicating presence of the transceiver module); (xxviii) P28=INTn; (xxix) P29=3.3V; (xxx) P30=3.3V; (xxxi) P31=LPMODE; (xxxii) P32=GND; (xxxiii) P33=TX3p; (xxxiv) P34=TX3n; (xxxv) P35=GND; (xxxvi) P36=TX1p; (xxxvii) P37=TX1n; and (xxxviii) P38=GND.

In system 100, switches 110a, b, c are in the form of MOSFETs (metal oxide semiconductor field effect transistors). Alternatively, these switches could take other forms, such as a hot swap controller or a load switch. If the power is supplied by a single POL (point of load) power supply then the ON/OFF pin (which is herein considered as a type of "switch") can be used instead of external FETs.

In system 100, microprocessor/programmable logic module 150 is made using Lattice MACH XO and XO2 family of parts. Alternatively, module 150 could be made from any FPGA (field programmable gate array) or CPLD (complex programmable logic device).

System 100 includes resistor 153, which, in this example has a resistance of 10 Kohms (kilo-ohms). Resistor 153 is used to keep the signal high when the transceiver is not plugged in. The use of a resistor in this embodiment is just one example of a specific implementation of achieving a predictable logic state that is dependent upon whether a transceiver module is present or absent. Other implementations to achieve the same functionality are possible.

Figure 4:
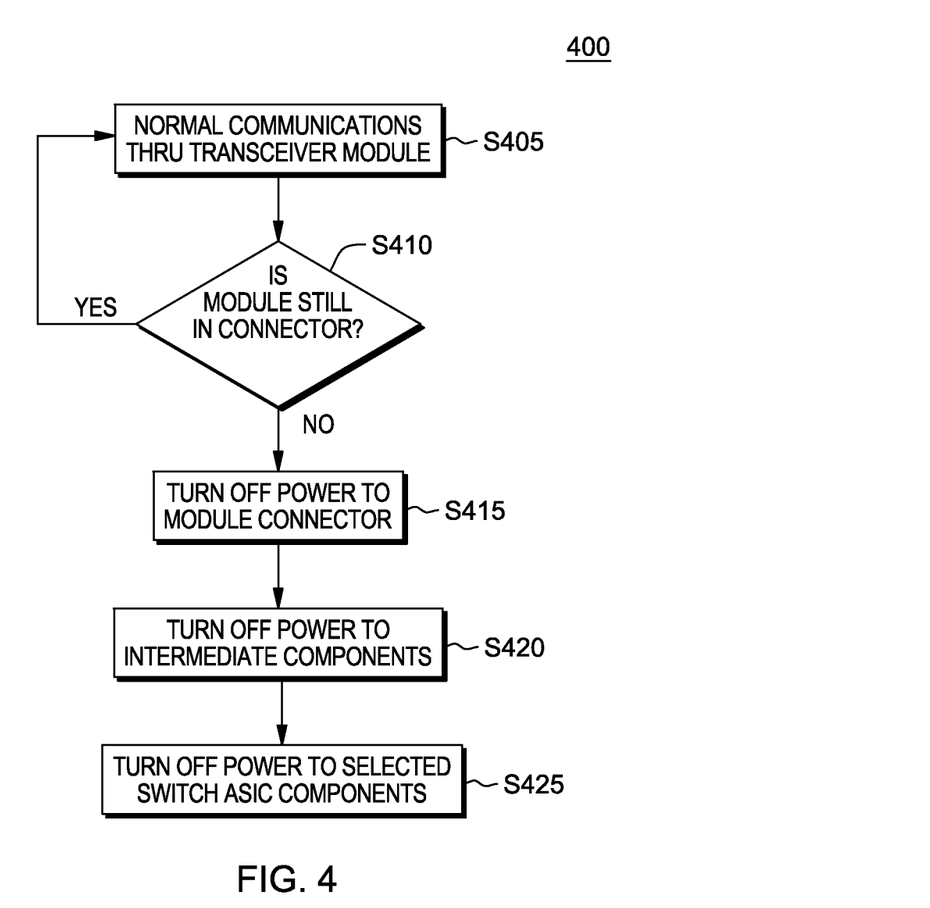
FIG. 4 is a flow chart showing a method performed, at least in part, by the first embodiment system.

Control software 154 is performed by microprocessor/programmable logic module 150 to perform a method shown in flow chart 400 of FIG. 4. This method, which occurs when pluggable transceiver module 200 is removed from plug-in module connector 120, will now be explained in the following paragraphs.

Processing begins at step S405, where pluggable transceiver module 200 is in plug-in module connector 120. During this time normal network switching operations occur, including communications communicated through pluggable transceiver module 200.

Processing proceeds to step S410, where control software 154 monitors the presence of the transceiver through communication line 121 in order to determine whether pluggable transceiver module 200 is still in place in plug-in module connector 120. If it is still in place then the signal received through communication line 121 will remain at the LOW status, and processing will loop back to step S405. However, if pluggable transceiver module 200 has been removed (by pulling it out in the direction of arrow D as shown in system 100, FIG. 1), then communication line 121 will change to HIGH status. In response to this change, control software 154 will cause processing to proceed to step S415. Alternatively, status could change from LOW to HIGH in order to indicate insertion of the transceiver module. These changes from LOW to HIGH or from HIGH to LOW are herein considered as one possible form of a "signal" that is received by control software 154. As a further alternative, more complex signals (such as, non-binary signals or multiple bit signals) could be used.

At step S415, control software 154 controls switch 110a to turn to off status in order to turn off power to plug-in module connector 120. In some embodiments, this is the main cause of power savings.

Processing proceeds to step S420, where control software 154 controls switch 110b to turn to off status in order to turn off power to ITPSP component set 104. In this embodiment, all ITPSP components receive power from a common DC power supply 111b, so all of the ITPSP components can be turned off with a single switch. Alternatively, the ITPSP component set may receive power from multiple DC power supplies, and are turned off by turning off multiple switches. As a further alternative, some or all of the ITPSP components may share a power supply with plug-in module connector 120 so that these components would be turned off by switch 110a at previous step S415. As a further alternative, ITPSP component set may include different ITPSP components than the ITPSP components included in network switching system 100. As a further alternative, in some embodiments step S420, and switch 110b, may be omitted.

Processing proceeds to step S425, where control software 154 controls switch 110c to turn to off status in order to turn off power to port sub-component 140 of switch ASIC 106. It is noted that switch ASIC 106 is not completely powered down, but its port sub-component is. In this example, switch ASIC 106 is not completely powered down because other ports need their data switched—a switch ASIC is usually 24 ports or more. Alternatively, additional sub-components of switch ASIC 106 could be powered off, which may or may not require additional power switches. As a further alternative, port sub-component 140 may share a power supply with plug-in module connector 120 and/or the ITPSP component set so that it does not need to be separately turned off by switch 110c. As a further alternative, in some embodiments step S425, and switch 110c, may be omitted.

This will involve controlling the power switches to power down the relevant devices and/or power down any DC (direct current) power supplies powering these devices. This will be done such that the powered down devices will not impact the operation of other circuitry in the equipment. Once these devices are powered down, the software will continue to monitor the module present pin, through communication line 121, for a switch from HIGH to LOW signal status indicating that pluggable transceiver module 200 is reinserted into the connector 120. As mentioned above, signal 121 is pulled to HIGH using resistor 153 when not plugged in. A converse process to that shown in flow chart 400 occurs when the pluggable transceiver module is re-inserted in plug-in module connector 120 and the components are powered up, initialized (for example, in the currently conventional way) and begin normal communication operations through transceiver 200.

The flowchart (of FIG. 4) and block diagrams (of FIGS. 1 to 3) illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Some embodiments of the present invention may include one, or more, of the following features, characteristics and/or advantages: (i) a power control solution that completely powers down any powered device in the path between the switch ASIC and the transceiver, whenever the transceiver module is not physically present in its receiving hardware (for example, slot or socket); (ii) an effective solution where the actual SerDes blocks within the switch are also powered off; (iii) use of ethernet switch ASICs that have separate power rails for the SerDes blocks; (iv) effectively monitoring the module present pins, to implement a real time power management solution with little to no added cost, by simply using the processor, a CPLD (complex programmable logic device), and some extra power switches to turn off the power; (v) if the power is supplied by a single POL power supply, then the ON/OFF pin can be used instead of the external power switches; (vi) an effective way to reduce power in switch products; (vii) a relatively easy method of knowing how much power is used in many typical configurations; and/or (viii) a competitive advantage in current ethernet and fiber channel switch environments.

The following paragraphs set forth some definitions.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Electrically connected: means either directly electrically connected, or indirectly electrically connected, such that intervening elements are present; in an indirect electrical connection, the intervening elements may include inductors and/or transformers.

Mechanically connected: Includes both direct mechanical connections, and indirect mechanical connections made through intermediate components; includes rigid mechanical connections as well as mechanical connections that allows for relative motion between the mechanically connected components; includes, but is not limited to, welded connections, solder connections, connections by fasteners (for example, nails, bolts, screws, nuts, hook-and-loop fasteners, knots, rivets, quick-release connections, latches and/or magnetic connections), force fit connections, friction fit connections, connections secured by engagement caused by gravitational forces, pivoting or rotatable connections, and/or slidable mechanical connections.

Software storage device: any device (or set of devices) capable of storing computer code in a manner less transient than a signal in transit.

Tangible medium software storage device: any software storage device (see Definition, above) that stores the computer code in and/or on a tangible medium.

Non-transitory software storage device: any software storage device (see Definition, above) that stores the computer code in a non-transitory manner.

Receiving connector: any connector in a network switching device that can receive a removable transceiver module.

Machine logic module: any set of hardware, software, firmware an/or combination of the foregoing types that can apply machine logic.

First signal/second signal: these two signals may be communicated through the same signal communication line; for example, a change from LOW to HIGH may be considered as a first signal, and a subsequent change from HIGH to LOW may be considered as second signal.

What is claimed is:

1. A method comprising:
  providing a transceiver-receiving system comprising:
    a first machine logic module;
    a first receiving connector;
    a first communication line;
    a first power supply connected to a first powered component set via a first switch;
    a switching-related powered transceiver signal processing component comprising a switch application specific integrated circuit (ASIC), wherein the first powered component set comprises a portion of the switch ASIC that includes serializer/deserializer (SerDes) blocks;
    a data bus structured to connect the first receiving connector and the switching-related powered transceiver signal processing component;
    a plurality of intermediate powered transceiver signal processing (IPTSP) components positioned in a path between the switching-related powered transceiver signal processing component and the first receiving connector, with each IPTSP component of the plurality of IPTSP components being in data communication with the data bus; and
a second power supply connected to the plurality of IPTSP components via a second switch;

receiving, from the first receiving connector through the first communication line and by the first machine logic module, a first signal indicating that a removable transceiver module has been removed from the first receiving connector;

controlling, by the first machine logic module in response to receipt of the first signal, the first switch to turn off stopping a flow of power from the first power supply to the first powered component set and to the first receiving connector; and controlling, by the first machine logic module in response to receipt of the first signal, the second switch to turn off stopping a flow of power from the second power supply to all IPTSP components of the plurality of IPTSP components, wherein the first switch is a solid state switch, and
wherein the second switch is a solid state switch.

2. The method of claim 1, further comprising:
receiving, from the first receiving connector through the first communication line and by the first machine logic module, a second signal indicating that a removable transceiver module has been placed into the first receiving connector; and
controlling, by the first machine logic module in response to receipt of the second signal, the first switch to turn on restoring the flow of power from the first power supply to the first powered component set and to the first receiving connector.

3. The method of claim 2, further comprising controlling, by the first machine logic module in response to receipt of the second signal, the second switch to turn on restoring the flow of power from the second power supply to all IPTSP components of the plurality of IPTSP components and to the first receiving connector, wherein the first switch comprises a metal oxide semiconductor field effect transistor (MOSFET).

4. The method of claim 1, wherein the transceiver-receiving system further comprises a third power supply connected to the switch ASIC via a third switch, the method further comprising:
controlling, by the first machine logic module in response to receipt of the first signal, the third switch to turn off stopping a flow of power from the third power supply to a port sub-component of the switch ASIC that is coupled to the first receiving connector with a proviso that the switch ASIC is not completely powered down in response to the flow of power from the third power supply being stopped via the third switch being turned off;
receiving, from the first receiving connector through the first communication line and by the first machine logic module, a second signal indicating that a removable transceiver module has been placed into the first receiving connector;
controlling, by the first machine logic module in response to receipt of the second signal, the first switch to turn on restoring the flow of power from the first power supply to the first powered component set and to the first receiving connector;
controlling, by the first machine logic module in response to receipt of the second signal, the second switch to turn on restoring the flow of power from the second power supply to all IPTSP components of the plurality of IPTSP components; and
controlling, by the first machine logic module in response to receipt of the second signal, the third switch to turn on restoring the flow of power from the third power supply to the port sub-component of the switch ASIC,
wherein the first switch comprises a metal oxide semiconductor field effect transistor (MOSFET),
wherein the first receiving connector is sized, shaped, connected, structured and/or located to receive at least one type of removable transceiver module selected from a group consisting of: small form-factor pluggable, small form-factor pluggable plus, and quad small form-factor pluggable plus, and
wherein the plurality of IPTSP components are selected from a group consisting of: a physical layer component, a serializer/deserializer component, a re-timer component, and an extended parallel server component.

5. The method of claim 1, wherein the first powered component set comprises one or more components selected from a group consisting of: a physical layer component, a serializer/deserializer component, a re-timer component, a buffer memory component, and an extended parallel server component.

6. The method of claim 1, wherein the first receiving connector is sized, shaped, connected, structured and/or located to receive at least one type of removable transceiver module selected from a group consisting of: small form-factor pluggable, small form-factor pluggable plus, and quad small form-factor pluggable plus.

7. The method of claim 1, wherein the plurality of IPTSP components are selected from a group consisting of: a physical layer component, a serializer/deserializer component, a re-timer component, and an extended parallel server component.

8. The method of claim 1, wherein the transceiver-receiving system further comprises a third power supply connected to the switch ASIC via a third switch, the method further comprising:
controlling, by the first machine logic module in response to receipt of the first signal, the third switch to turn off stopping a flow of power from the third power supply to a port sub-component of the switch ASIC that is coupled to the first receiving connector with a proviso that the switch ASIC is not completely powered down in response to the flow of power from the third power supply being stopped via the third switch being turned off;
receiving, from the first receiving connector through the first communication line and by the first machine logic module, a second signal indicating that a removable transceiver module has been placed into the first receiving connector; and
controlling, by the first machine logic module in response to receipt of the second signal, the third switch to turn on restoring the flow of power from the third power supply to the port sub-component of the switch ASIC.

9. A transceiver-receiving system, the system comprising:
a first machine logic module;
a first receiving connector;
a first communication line;

a first power supply connected to a first powered component set via a first switch, wherein the first powered component set does not include the first receiving connector;

a switching-related powered transceiver signal processing component comprising a switch application specific integrated circuit (ASIC), wherein the first powered component set comprises a portion of the switch ASIC that includes serializer/deserializer (SerDes) blocks;

a data bus structured to connect the first receiving connector and the switching-related powered transceiver signal processing component;

a plurality of intermediate powered transceiver signal processing (IPTSP) components positioned in a path between the switching-related powered transceiver signal processing component and the first receiving connector, with each IPTSP component of the plurality of IPTSP components being in data communication with the data bus; and a second power supply connected to the plurality of IPTSP components via a second switch, wherein the first receiving connector, the first communication line, and the first machine logic module are structured, connected and/or programmed to send from the first receiving connector through the first communication line to the first machine logic module, a first signal indicating that a removable transceiver module has been removed from the first receiving connector, wherein the first machine logic module is structured, connected and/or programmed to, in response to receipt of the first signal, control the first switch to turn off stopping a flow of power from the first power supply to the first powered component set and to the first receiving connector, wherein the first machine logic module is structured, connected and/or programmed to, in response to receipt of the first signal, control the second switch to turn off stopping a flow of power from the second power supply to all IPTSP components of the plurality of IPTSP components, wherein the first switch is a solid state switch, and wherein the second switch is a solid state switch.

10. The system of claim 9, wherein the first receiving connector, the first communication line, and the first machine logic module are further structured, connected and/or programmed to send from the first receiving connector, through the first communication line, to the first machine logic module, a second signal indicating that a removable transceiver module has been placed into the first receiving connector, and wherein the first machine logic module is further structured, connected and/or programmed to, in response to receipt of the second signal, control the first switch to turn on restoring the flow of power from the first power supply to the first powered component set and to the first receiving connector.

11. The system of claim 10, wherein the first machine logic module is further structured, connected and/or programmed to control, in response to receipt of the second signal, the second switch to turn on restoring the flow of power from the second power supply to all IPTSP components of the plurality of IPTSP components and to the first receiving connector, wherein the first switch comprises a metal oxide semiconductor field effect transistor (MOSFET), and wherein the second switch comprises a MOSFET.

12. The system of claim 10, further comprising a third power supply connected to the switch ASIC via a third switch, wherein the first machine logic module is structured, connected and/or programmed to:

control, in response to receipt of the first signal, the third switch to turn off stopping a flow of power from the third power supply to a port sub-component of the switch ASIC that is coupled to the first receiving connector with a proviso that the switch ASIC is not completely powered down in response to the flow of power from the third power supply being stopped via the third switch being turned off;

control, in response to receipt of the second signal, the second switch to turn on restoring the flow of power from the second power supply to the plurality of IPTSP components; and control, in response to receipt of the second signal, the third switch to turn on restoring the flow of power from the third power supply to the port sub-component of the switch ASIC, wherein the first switch comprises a metal oxide semiconductor field effect transistor (MOSFET), wherein the first receiving connector is sized, shaped, connected, structured and/or located to receive at least one type of removable transceiver module selected from a group consisting of: small form-factor pluggable, small form-factor pluggable plus, and quad small form-factor pluggable plus, and wherein the plurality of IPTSP components are selected from a group consisting of: a physical layer component, a serializer/deserializer component, a re-timer component, and an extended parallel server component.

13. The system of claim 9, wherein the first powered component set comprises one or more components selected from a group consisting of: a physical layer component, a serializer/deserializer component, a re-timer component, a buffer memory component, and an extended parallel server component.

14. The system of claim 9, wherein the first receiving connector is sized, shaped, connected, structured and/or located to receive at least one type of removable transceiver module selected from a group consisting of: small form-factor pluggable, small form-factor pluggable plus, and quad small form-factor pluggable plus.

15. The system of claim 9, wherein the plurality of IPTSP components are selected from a group consisting of: a physical layer component, a serializer/deserializer component, a re-timer component, and an extended parallel server component.

16. The system of claim 9, further comprising a third power supply connected to the switching-related powered transceiver signal processing component via a third switch, wherein the switching-related powered transceiver signal processing component comprises a switch application specific integrated circuit (ASIC), wherein the first machine logic module is structured, connected and/or programmed to:

in response to receipt of the first signal, control the third switch to turn off stopping a flow of power from the third power supply to a port sub-component of the switch ASIC that is coupled to the first receiving connector with a proviso that the switch ASIC is not completely powered down in response to the flow of power from the third power supply being stopped via the third switch being turned off;

receive, from the first receiving connector through the first communication line, a second signal indicating that a removable transceiver module has been placed into the first receiving connector; and control, in response to receipt of the second signal, the third switch to turn on restoring the flow of power from the third power supply to the port sub-component of the switch ASIC.

* * * * *